United States Patent
Ma et al.

(10) Patent No.: US 11,871,004 B2
(45) Date of Patent: Jan. 9, 2024

(54) VIDEO IMAGE PROCESSING METHOD AND DEVICE, AND STORAGE MEDIUM

(71) Applicant: SZ DJI TECHNOLOGY CO., LTD., Shenzhen (CN)

(72) Inventors: Siwei Ma, Beijing (CN); Jiaqi Zhang, Beijing (CN); Xiaozhen Zheng, Shenzhen (CN); Shanshe Wang, Beijing (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 132 days.

(21) Appl. No.: 17/645,930

(22) Filed: Dec. 23, 2021

(65) Prior Publication Data

US 2022/0124346 A1 Apr. 21, 2022

Related U.S. Application Data

(63) Continuation of application No. PCT/CN2019/095328, filed on Jul. 9, 2019.

(30) Foreign Application Priority Data

Jun. 25, 2019 (WO) ................ PCT/CN2019/092869

(51) Int. Cl.
*H04N 19/176* (2014.01)
*H04N 19/186* (2014.01)
(Continued)

(52) U.S. Cl.
CPC ......... *H04N 19/149* (2014.11); *H04N 19/159* (2014.11); *H04N 19/176* (2014.11); *H04N 19/186* (2014.11)

(58) Field of Classification Search
CPC .. H04N 19/149; H04N 19/159; H04N 19/176; H04N 19/186; H04N 19/105;
(Continued)

(56) References Cited

U.S. PATENT DOCUMENTS 11,503,342 B2 * 11/2022 Deshpande .......... H04N 19/186
2015/0098510 A1    4/2015 Ye et al.
(Continued)

FOREIGN PATENT DOCUMENTS

CN    103067701 A    4/2013
CN    103959790 A    7/2014
(Continued)

OTHER PUBLICATIONS

The World Intellectual Property Organization (WIPO) International Search Report for PCT/CN2019/095328 dated Mar. 24, 2020 5 Pages.
(Continued)

*Primary Examiner* — Tung T Vo
(74) *Attorney, Agent, or Firm* — ANOVA LAW GROUP PLLC (57) ABSTRACT

A video image processing method includes binarizing a chrominance prediction mode of the image block of a to-be-encoded/decoded image to obtain a bit string, the bit string including two adjacent bits, the to-be-encoded/decoded image being permitted to use a CCLM and/or a regular intra-frame chrominance prediction mode, and the CCLM including a first mode, a second mode, and a third mode, and using mutually independent probability models to encode/decode a first bit and a second bit. The first bit of the adjacent bits indicates whether the CCLM is used, the second bit indicates whether to use the first mode of the CCLM when the first bit indicates to use the CCLM, the third bit indicates whether the second mode or the third mode of the CCLM is used when the second bit indicates that the first mode of the CCLM is not used.

17 Claims, 3 Drawing Sheets

(51) Int. Cl.
*H04N 19/149* (2014.01)
*H04N 19/159* (2014.01)

(58) Field of Classification Search
CPC ...... H04N 19/11; H04N 19/13; H04N 19/184; H04N 19/463; H04N 19/70; H04N 19/91; H04N 19/593
USPC ..................................................... 375/240.02
See application file for complete search history.

(56) References Cited

U.S. PATENT DOCUMENTS

| | | | |
|---|---|---|---|
| 2017/0214921 | A1 | 7/2017 | Kubota et al. |
| 2017/0366818 | A1 | 12/2017 | Zhang et al. |
| 2018/0077426 | A1 | 3/2018 | Zhang et al. |
| 2018/0205946 | A1 | 7/2018 | Zhang et al. |
| 2019/0104323 | A1 | 4/2019 | Baylon et al. |
| 2022/0116636 | A1* | 4/2022 | Kang ................ H04N 19/70 |
| 2022/0150475 | A1* | 5/2022 | Zhu ................ H04N 19/186 |
| 2022/0159241 | A1* | 5/2022 | Zhu ................ H04N 19/117 |
| 2022/0182636 | A1* | 6/2022 | Zhu ................ H04N 19/159 |
| 2022/0360800 | A1* | 11/2022 | Xu ................ H04N 19/593 |
| 2023/0217030 | A1* | 7/2023 | Li ................ H04N 19/593 375/240.12 |

FOREIGN PATENT DOCUMENTS

| | | | |
|---|---|---|---|
| CN | 104093025 | A | 10/2014 |
| CN | 104871537 | A | 8/2015 |
| CN | 106664425 | A | 5/2017 |
| CN | C109274969 | A | 1/2019 |
| CN | 109479134 | A | 3/2019 |
| CN | 109565599 | A | 4/2019 |
| CN | 109565603 | A | 4/2019 |
| CN | 109792538 | A | 5/2019 |
| CN | 111602396 | A | 8/2020 |
| WO | 2016115708 | A1 | 7/2016 |
| WO | 2018140587 | A1 | 8/2018 |
| WO | 2018174357 | A1 | 9/2018 |
| WO | 2018236028 | A1 | 12/2018 |

OTHER PUBLICATIONS

The World Intellectual Property Organization (WIPO) International Search Report for PCT/CN2019/092896 dated Mar. 26, 2020 6 Pages.

Yukinobu Yasugi, et al., "Non-CE3: CCLM table reduction and bit range control", << JVET-M0064>>, Jan. 18, 2019.

Benjamin Bross et al: "Versatile Video Coding (Draft 5)", 14. JVET Meeting; Mar. 19-27, 2019; Geneva; (The Joint Video Exploration Team of ISO/IEC JTC1/SC29/WG11 and ITU-T SG.16 ), No. JVET-N1001-v8; JVET-N1001 Jun. 11, 2019, pp. 1-397.

Ray (Qualcomm) B et al: "Non-CE3: Revised intra chroma mode coding simplification", 127. MPEG Meeting; Jul. 8-12, 2019; Gothenburg; (Motion Picture Expert Group or ISO/IEC JTC1/SC29/WG11), No. m49838 Jul. 8, 2019.

Sullivan Gary et al., "Meeting Report of the 15th JVET Meeting (Gothenburg, Se, Jul. 3-12, 2019)", 15. JVET Meeting, No. JVET-O2000,Sep 30, 2019, Gothenburg, Retrieved from the Internet: URL:https://jvet-experts.org/doc_end_user/documents/15_Gothenburg/wg 11 /JVET-O2000-v1 .zip JVET-O2000-v1 .docx.

Bappaditya Ray et al., Non-CE3: Intra chroma mode coding simplification, Joint Video Experts Team (JVET), Jul. 7, 2019, pp. 1-10, JEVT-O0671-v3, Version 6.

* cited by examiner

VIDEO IMAGE PROCESSING METHOD AND DEVICE, AND STORAGE MEDIUM

CROSS-REFERENCE TO RELATED APPLICATIONS

This application is a continuation of International Application No. PCT/CN2019/095328, filed on Jul. 9, 2019, which claims priority to International Application No. PCT/CN2019/092869, filed on Jun. 25, 2019, the entire contents of both of which are incorporated herein by reference.

TECHNICAL FIELD

The present disclosure relates to the technical field of video encoding/decoding and, more specifically, to a video image processing method and device, and a storage medium.

BACKGROUND

In versatile video coding, chrominance prediction uses multiple prediction modes including the cross-component linear model (CCLM) to improve the accuracy of chrominance component prediction. When the CCLM prediction mode is used to analyze the number of the chrominance prediction mode of an image block, there is a dependency on the bit analysis of different predictions. For example, the encoding/decoding method of the bit in the fourth position of the image block needs to refer to the value of the bit in the third position. Using this method will lead to higher encoding/decoding complexity and lower encoding/decoding efficiency. Therefore, how to better improve the encoding/decoding efficiency has become the focus of research.

SUMMARY

A first aspect of the present disclosure provides a video image processing method. The method includes binarizing a chrominance prediction mode of an image block of a to-be-encoded/decoded image to obtain a bit string, the bit string including at least two adjacent bits, the to-be-encoded/decoded image being permitted to use a cross-component linear model (CCLM) and/or a regular intra-frame chrominance prediction mode, the CCLM including at least a first mode, a second mode, and a third mode, the regular intra-frame chrominance prediction mode being other intra-frame chrominance prediction modes expect the CCLM. A first bit of the adjacent bits is used to indicate whether the CCLM is used, a second bit is used to indicate whether to use the first mode of the CCLM when the first bit indicates to use the CCLM, and a third bit is used to indicate whether the second mode or the third mode of the CCLM is used when the second bit indicates that the first mode of the CCLM is not used. The method further includes using mutually independent probability models to respectively encode/decode the first bit and the second bit.

A second aspect of the present disclosure provides a video image processing device. The device includes a processor and a memory storing program instructions that, when being executed by the processor, cause the processor to binarize a chrominance prediction mode of an image block of a to-be-encoded/decoded image to obtain a bit string, the bit string including at least two adjacent bits, the to-be-encoded/decoded image being permitted to use a cross-component linear model (CCLM) and/or a regular intra-frame chrominance prediction mode, the CCLM including at least a first mode, a second mode, and a third mode, the regular intra-frame chrominance prediction mode being other intra-frame chrominance prediction mode expect the CCLM. A first bit of the adjacent bits is used to indicate whether the CCLM is used, the second bit is used to indicate whether to use the first mode of the CCLM when the first bit indicates to use the CCLM, the third bit is used to indicate whether the second mode or the third mode of the CCLM is used when the second bit indicates that the first mode of the CCLM is not used. The processor is further configured to use mutually independent probability models to respectively encode/decode the second bit and the third bit.

A third aspect of the present disclosure provides a computer-readable storage medium storing a bitstream obtained by a processor executing a computer program to binarize a chrominance prediction mode of an image block of a to-be-encoded/decoded image to obtain a bit string, the bit string including at least two adjacent bits, the to-be-encoded/decoded image being permitted to use a cross-component linear model (CCLM) and/or a regular intra-frame chrominance prediction mode, the CCLM including at least a first mode, a second mode, and a third mode, the regular intra-frame chrominance prediction mode being other intra-frame chrominance prediction modes expect the CCLM. A first bit of the adjacent bits is used to indicate whether the CCLM is used, a second bit is used to indicate whether to use the first mode of the CCLM when the first bit indicates to use the CCLM, a third bit is used to indicate whether the second mode or the third mode of the CCLM is used when the second bit indicates that the first mode of the CCLM is not used. The processor is further configured to execute the computer program to use mutually independent probability models to respectively encode/decode the first bit and the second bit.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Exemplary embodiments will be described with reference to the accompanying drawings. In the case where there is no conflict between the exemplary embodiments, the features of the following embodiments and examples may be combined with each other.

The video processing method provided in the embodiments of the present disclosure can be applied to a video processing device, and the video processing device can be set on a smart terminal (such as a mobile phone, a tablet, etc.). In some embodiments, the embodiments of the present disclosure can be applied to aircrafts (such as unmanned aerial vehicles). In other embodiments, the embodiments of the present disclosure can also be applied to other movable platforms (such as unmanned ships, unmanned vehicles, robots, etc.), which is not limited in the embodiments of the present disclosure.

The video image processing method provided in the embodiments of the present disclosure is mainly applied to codecs that comply with the international video coding standard H.264, the high efficiency video coding (HEVC), VVC, and the Chinese audio video coding standard (AVS), AVS+, AVS2, and AVS3. Before introducing the embodiments of the present disclosure, the chrominance prediction technology in the video coding standard will be explained.

The input of video coding is a video sequence in YUV format, where Y is the luminance component, and U and V are the chrominance components. In the new generation of video coding standard, VVC, the CCLM mode is introduced to improve the accuracy of chrominance component prediction.

Figure 1A:
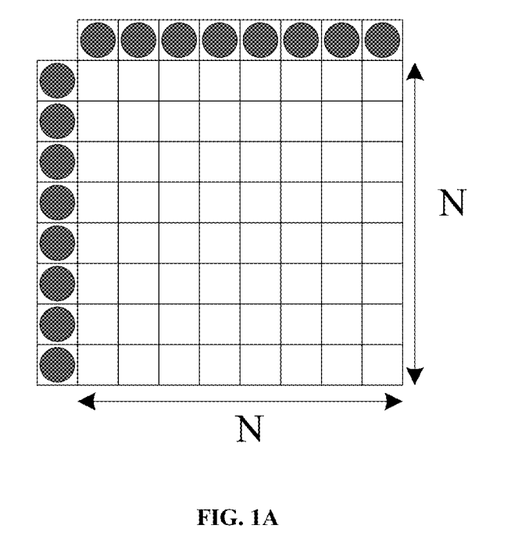
FIG. 1A is a schematic diagram of a CCLM according to an embodiment of the present disclosure.
Figure 1B:
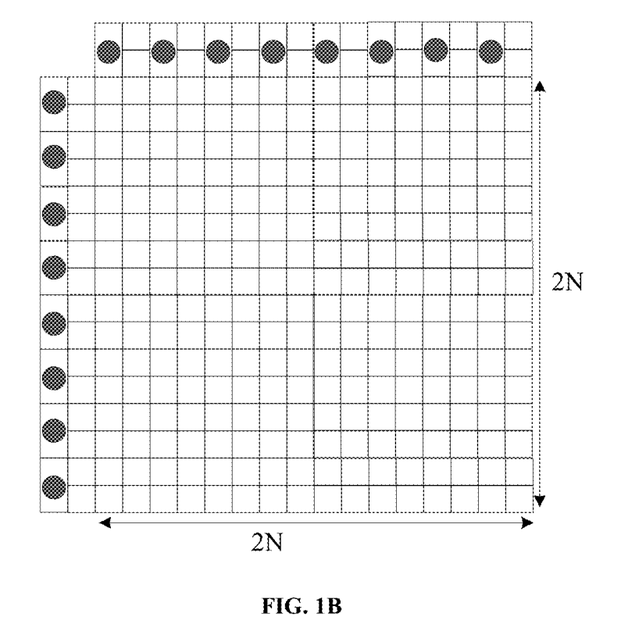
FIG. 1B is a schematic diagram of another CCLM according to an embodiment of the present disclosure.

An example of CCLM will be described in conjunction with FIG. 1A and FIG. 1B, where FIG. 1A is a schematic diagram of a CCLM according to an embodiment of the present disclosure, and FIG. 1B is a schematic diagram of another CCLM according to an embodiment of the present disclosure. FIG. 1A shows the current chrominance blocks, and FIG. 1B shows the chrominance prediction blocks based on the current chrominance blocks of FIG. 1A. Since there is a strong correlation between the different components of the video sequence, the coding performance can be improved by using the correlation between the different components of the video sequence. Therefore, in order to reduce the redundant information between components, in the CCLM prediction mode, the chrominance component can be predicted based on the reconstructed luminance component in the same block, and the following linear model can be used.

$$pred_C(i,j) = \alpha \cdot rec'_L(i,j) + \beta$$

where $pred_C$ is the chrominance prediction block, B is the down-sampled luminance component of the luminance coding block at the same position, and the parameters $\alpha$ and $\beta$ are derived by minimizing the regression error between adjacent reconstructed luminance and chrominance samples, as shown in the following formula (1) and formula (2).

$$\alpha = \frac{N \cdot \Sigma(L(n) \cdot C(n)) - \Sigma L(n) \cdot \Sigma C(n)}{N \cdot \Sigma(L(n) \cdot L(n)) - \Sigma L(n) \cdot \Sigma L(n)} \quad (1)$$

$$\beta = \frac{\Sigma C(n) - \alpha \cdot \Sigma L(n)}{N} \quad (2)$$

where $L(n)$ represents the reconstructed luminance sample after the down-sampling of the adjacent column on the left and the adjacent row above, $C(n)$ represents the reconstructed chrominance samples adjacent to the left and above of the current chrominance block. $\alpha$ and $\beta$ may not need to be transmitted, and $\alpha$ and $\beta$ may be calculated in the same way in the decoder.

It should be noted that prediction is an important module of the mainstream video coding framework. Intra-frame prediction uses reconstructed neighboring pixels to obtain prediction blocks through different prediction modes. In addition to the conventional Planar mode, DC mode, and 65 angle mode for the prediction of the luminance and chrominance components, the chrominance prediction mode also introduces a new CCLM mode. A frame of image can be first divided into coding areas (coding tree units (CTUs)) of the same size, such as 64×64 or 128×128. Each CTU may be further divided into square or rectangular coding units (CUs). In the CTU of an intra-frame coding frame I frame, the luminance component and the chrominance component may have different divisions. In the bidirectional predictive interpolation coding frame B frame and the forward predictive coding frame P frame, the luminance component and the chrominance component may have the same division method. The number of the chrominance prediction mode of the image block may be transmitted in the bitstream.

At present, the intra-frame prediction technologies in mainstream video coding standards mainly include the Planar mode, DC mode, and 65 angle mode. In addition, the chrominance prediction mode also includes the CCLM mode. The CCLM mode may include various types, such as including at least one of the three predictions modes of LT_CCLM, T_CCLM, and L_CCLM. The number of the chrominance prediction mode may be transmitted in the bitstream. In order to reduce coding complexity, in an example, there may be five or eight chrominance prediction modes based on whether the CCLM mode is turned on.

When the CCLM mode is turned off, there may be five chrominance prediction modes, and the corresponding relationships of the five chrominance prediction modes are shown in Table 1 below. Table 1 shows the chrominance prediction modes when CCLM is turned off. For the luminance mode, Number 0 may be the Planar mode, Number 1 may be the DC mode, Number 50 may be the vertical angle mode, and Number 18 may be the horizon angle mode.

In some embodiments, the number of the chrominance prediction mode may be searched by looking up the number of the chrominance prediction mode corresponding to the luminance mode through Table 1 based on the luminance mode.

Table 1 will be used as an example to illustrate the process of looking up the luminance mode by using Table 1. When the CCLM mode is turned off, if the luminance mode is the Number 0 Planar mode and the chrominance prediction mode number is Number 1, then based on Table 1, it can be determined that the Number 0 luminance mode and the Number 1 chrominance prediction mode that can correspond to the luminance mode is the vertical angle mode Number 50 in the third row and the second column. In another example, when the CCLM mode is turned off, if the luminance mode is the Number 18 horizon angle mode and the chrominance prediction mode is Number 3, then based on Table 1, it can be determined that the Number 18 luminance mode and the Number 3 chrominance prediction mode that can correspond to the luminance mode is the DC mode Number 1 in the fifth row and the third column.

TABLE 1

| Chrominance Prediction Mode Number | Luminance Mode | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

A bit string may be obtained by binarizing the chrominance prediction mode of the image block to encode/decode the bits in the bit string. In some embodiments, the bits may represent the encoding/decoding bits or the encoding/decoding binary symbols (bin)

When the CCLM mode is turned off, the method of binarizing the chrominance prediction modes shown in Table 1 may be as shown in Table 2 below, where the Number 4 mode may be the chrominance DM mode.

TABLE 2

| Chrominance Prediction Mode Number | Binarization |
|---|---|
| 4 | 0 |
| 0 | 100 |
| 1 | 101 |
| 2 | 110 |
| 3 | 111 |

When the CCLM mode is turned off, after the chrominance prediction mode is binarized, the bit in the first position of the bit string may be coded using the context of Number 0, and both the second position and the third position of the bit string may use the equal probability bypass mode. At this time, there may be no dependence on the bits in different positions of the coded chrominance prediction mode number.

In some embodiments, context (or context model, or context probability mode) can refer to a model that updates the occurrence probability of different bins based on the recently encoded/decoded bins in the context-based adaptive binary arithmetic encoding/decoding process.

When the CCLM mode is turned on, there may be eight chrominance prediction modes. In an example, the eight chrominance prediction modes correspond to Table 3 below, where the chrominance prediction mode Numbers 4, 5, and 6 correspond to the LT_CCLM, L_CCLM, and T_CCLM modes, respectively, Number 7 is the DM mode, and Numbers 0, 1, 2, and 3 are other modes or regular intra-frame chrominance prediction modes.

TABLE 3

| Chrominance Prediction Mode Number | Luminance Mode | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

Table 3 will be used as an example to illustrate the process of looking up the luminance mode by using Table 3. When the CCLM mode is turned off, if the luminance mode is the Number 0 Planar mode and the chrominance prediction mode number is the Number 5 L_CCLM mode, then based on Table 3, it can be determined that the luminance mode corresponding to the luminance mode Number 0 and the chrominance prediction mode Number 5 is the Number 82 mode in the seventh row and the second column. In another example, when the CCLM mode is turned on, if the luminance mode is the Number 18 horizon angle mode and the chrominance prediction mode number is the Number 7 DM mode, then based on Table 3, it can be determined that the luminance mode corresponding to the luminance mode Number 18 and the chrominance prediction mode Number 8 is the horizon angle mode Number 18 in the ninth row and the fourth column.

When the CCLM mode is turned on, the chrominance prediction mode shown in Table 3 may be binarized as shown in Table 4 below.

TABLE 4

| Chrominance Prediction Mode Number | Binarization |
|---|---|
| 7 | 0 |
| 4 | 10 |
| 5 | 1110 |
| 6 | 1111 |
| 0 | 11000 |
| 1 | 11001 |
| 2 | 11010 |
| 3 | 11011 |

When transmitting in the bitstream, based on whether the CCLM mode is turned on, the number of the chrominance prediction mode may have a different value range, and the bit string after binarization may be encoded and transmitted in the bitstream.

As shown in Table 4, the bit at the first position in the bit string may be used to indicate whether to use the DM mode or other modes. The other modes other than the DM mode may include, but are not limited to, the CCLM mode or the regular intra-frame chrominance prediction mode. For example, if the bit string after the binarization of the chrominance prediction mode Number 7 is 0 and the bit in the first position is 0, then the DM mode can be determined to be used. In another example, if the bit string after the binarization of the chrominance prediction mode Number 4 is 10 and the bit in the first position is 1, then other modes other than the DM mode can be determined to be used.

The bit in the second position may be used to indicate whether to use the LT_CCLM mode. For example, if the bit string after the binarization of the chrominance prediction mode Number 4 is 10 and the bit in the second position is 0, then the LT_CCLM mode can be determined to be used.

The bit in the third position may be used to indicate that other modes other than the LT_CCLM mode is used when the bit in the second position indicates that the LT_CCLM mode is not used. For example, the bit in the third position of the chrominance prediction mode Numbers 5, 6, 0, 1, 2, and 3 after binarization may be used to indicate the use of other modes other than the LT_CCLM mode. The bit in the fourth position may be used to indicate that L_CCLM mode or T_CCLM mode is used when the bit in the third position is 1. For example, if the bit string of the chrominance prediction mode Number 5 after binarization is 1110 and bit in the fourth position is 0, then it can be determined that the L_CCLM mode is used. In another example, if the bit string of the chrominance prediction mode Number 6 after binarization is 1111 and the bit in the fourth position is 1, then it can be determined that the T_CCLM mode is used.

When the bit in the third position is 0, the bit in the fourth position and the bit in the fifth position may be used to indicate the number of the chrominance prediction mode being used. For example, the bit string after binarization of chrominance prediction mode Number 0 may be 11000, the bit string after binarization of chrominance prediction mode Number 1 may be 11001, the bit string after binarization of chrominance prediction mode Number 2 may be 11010, and the bit string after binarization of chrominance prediction mode Number 3 may be 11011.

In some embodiments, the bit string may be a 1-bit bit string. Take Table 4 as an example, the bit string corresponding to the binarization of the chrominance prediction mode Number 7 is 0, then it can be determined that the chrominance prediction mode Number 7 is using the DM mode.

In some embodiments, the bit string may include two adjacent bits. Take Table 4 as an example, assuming that the video image processing device binarizes the chrominance prediction mode Number 4 of the image block of the to-be-encoded/decoded image, and the obtained the bit string is 10, and the bit in the first position is 1, then it can be determined that the chrominance prediction mode of the image block does not use the DM mode, that is, other modes other than the DM mode is used. The CCLM mode or the regular intra-frame chrominance prediction mode may be used. Further, the bit in the second position is 0, then it can be determined that the chrominance prediction mode of the image block uses the LT_CCLM mode in the CCLM mode.

When the CCLM mode is turned on, the chrominance prediction modes increase from five to eight. At this time, the bit at the first position, the bit at the second position, and the bit at the third position of the bit string may be coded with the contexts of Number 0, 1, and 2, respectively. When encoding the bit in the fourth position, the encoding method may need to be determined based on the value of the bit in the third position. When the value of the bit in the third position is equal to 0, the bit in the fourth position and the bit in the fifth position may be coded using bypass. When the value of the bit in the third position is equal to 1, the bit in the fourth position may be coded with the context of Number 2. At this time, the decoding process may need to determine the value of the bit at the third position before further decoding the bit at the fourth position.

In some embodiments, the coding process of the chrominance prediction mode number may be as shown in Table 5 below.

TABLE 5

| Syntax Element | Bit Position Idx | | | | |
| --- | --- | --- | --- | --- | --- |
| | 0 | 1 | 2 | 3 | 4 |
| Chrominance prediction mode not using the CCLM mode | 0 | bypass | bypass | na | na |
| Chrominance prediction mode using the CCLM mode and the bit value of the bit position Idx equals 2 is 0 | 0 | 1 | 2 | bypass | bypass |
| Chrominance prediction mode using the CCLM mode and the bit value of the bit position Idx equals 2 is 1 | 0 | 1 | 2 | 2 | na | where na is used to indicate an empty coding mode, bypass is used to indicate a corresponding bypass coding mode below.

As shown in Table 5 above, the bit position Idx includes 0, 1, 2, 3, and 4, where 0 is used to indicate the bit position of the first position, 1 is used to indicate the bit position of the second position, that is, the first bit position, 2 is used to indicate the bit position of the third position, that is, the second bit position, 3 is used to indicate the bit position of the fourth position, that is, the third bit position, and 4 is used to indicate the bit position of the fourth position, that is, the third bit position.

It can be seen from the implementation technical details of the coding chrominance prediction mode numbers shown in Table 5 above, when the CCLM mode is turned on, the analysis process of the bit in the fourth mode needs to depend on the value of the bit in the third position. If the value of the bit in the third position equals to 0, bypass encoding can be used to encode the bit in the fourth position. Further, if the value of the bit in the third position equals to 1, the context-based binary arithmetic encoding can be used as the encoding method. Therefore, it can be determined that the value of the bit in the fourth position depends on the value of the bit in the third position, resulting in a connection between the bit in the fourth position and the bit in the third position. This implementation method is cumbersome and has low encoding/decoding efficiency.

Therefore, an embodiment of the present disclosure proposes to perform binarization on the chrominance prediction mode of the image block of the to-be-encoded/decoded image to obtain a bit string, the bit string including at least three adjacent bits. In some embodiments, the to-be-encoded/decoded image may use a cross-component linear model (CCLM) and/or a regular intra-frame chrominance prediction mode. The CCLM may include at least a first mode, a second mode, and a third mode, and the regular intra-frame chrominance prediction mode may be another chrominance prediction mode other than the CCLM.

In some embodiments, the first bit of the three adjacent bits may be used to indicate whether to use the first mode of the CCLM. The second bit may be used to indicate whether a CCLM mode other than the first mode is used when the first bit indicates that the first mode of the CCLM is not used. The third bit may be used to indicate whether the image block uses the second mode or the third mode of the CCLM when the second bit indicates that other modes of the CCLM other than the first mode is used. Mutually independent probability models are used to respectively encode/decode the second bit and the third bit. Further, mutually independent probability models are used to respectively encode/decode the three adjacent bits.

In one embodiment, the first bit of the three adjacent bits may be used to indicate whether to use the CCLM. When the first bit indicates to use the CCLM, the second bit may be used to indicate whether to use the first mode of the CCLM. When the second bit indicates that the first mode of the CCLM is not used, the third bit may be used to indicate whether the second mode or the third mode of the CCLM is used. Mutually independent probability models are used to respectively encode the first bit and the second bit. Further, mutually independent probability models are used to encode/decode the three adjacent bits.

In some embodiments, the use of mutually independent probability models for encoding and decoding may be that the probability model used when encoding and decoding a bit will not be affected by the value of other bits (such as the adjacent bits), that is, it will not change with the value of other bits.

In some embodiments, the three adjacent bits may be positioned in the same syntax element (e.g., the three adjacent bits may be all position in the intra-frame chrominance prediction mode).

Consistent with the present disclosure, the implementation methods can effectively reduce the complexity of hardware analysis while maintaining a variety of chrominance prediction modes to increase performance. The improved chrominance mode encoding/decoding method proposed in the present disclosure can improve the parallelism of hardware analysis, remove the encoding/decoding dependence of different bit positions, simplify the encoding/decoding of each bit, and improve the encoding/decoding efficiency without significant loss of the encoding/decoding performance.

The video image processing method provided in the embodiments of the present disclosure will be described below with reference to the accompanying drawings.

Figure 2:
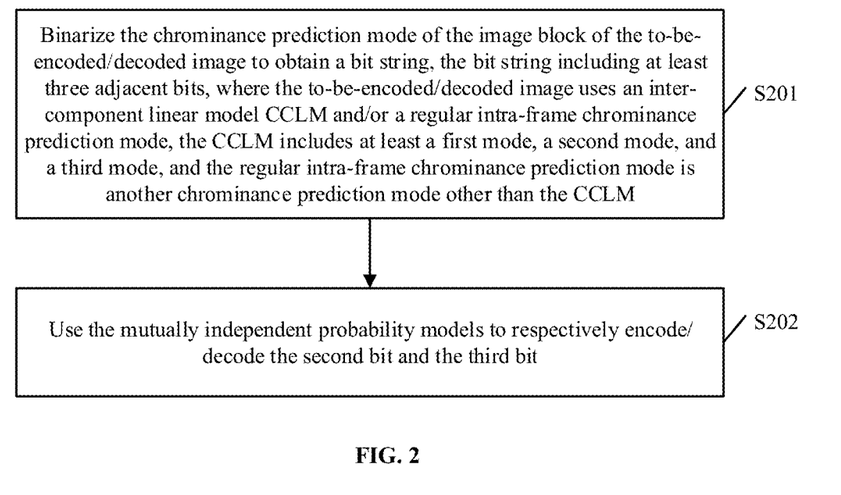
FIG. 2 is a flowchart of a video image processing method according to an embodiment of the present disclosure.

Referring to FIG. 2, which is a flowchart of a video image processing method according to an embodiment of the present disclosure. The method can be applied to a video image processing device. The explanation of the video image processing device is described above, which will not be repeated here. More specifically, the method of an embodiment of the present disclosure may include the following processes.

S201, binarizing the chrominance prediction mode of the image block of the to-be-encoded/decoded image to obtain a bit string, the bit string including at least three adjacent bits, where the to-be-encoded/decoded image may use a cross-component linear model (CCLM) and/or a regular intra-frame chrominance prediction mode, the CCLM may include at least a first mode, a second mode, and a third mode, and the regular intra-frame chrominance prediction mode may be another chrominance prediction mode other than the CCLM.

In the embodiments of the present disclosure, the video image processing device may binarize the chrominance prediction mode of the image block of the to-be-encoded/decoded image to obtain a bit string, and the bit string may include at least three adjacent bits. In some embodiments, the to-be-encoded/decoded image may use a cross-component linear model (CCLM) and/or a regular intra-frame chrominance prediction mode. The CCLM may include at least a first mode, a second mode, and a third mode, and the regular intra-frame chrominance prediction mode may be another chrominance prediction mode other than the CCLM.

In some embodiments, the first bit of the three adjacent bits may be used to indicate whether to use the first mode of the CCLM. When the first bit indicates that the first mode of the CCLM is not used, the second bit may be used to indicate whether other modes of the CCLM other than the first mode is used. When the second bit indicates that the CCLM mode other than the first mode is used, the third bit may be used to indicate that the image block uses the second mode or the third mode of the CCLM.

In some embodiments, the first bit may be the bit at the second position in the bit string, the second bit may be the bit at the third position in the bit string, and the third bit may be the bit at the fourth position of the bit string. Take the binarized bit string 1110 of the chrominance prediction mode Number 5 in Table 4 as an example to illustrate the three adjacent bits. The first bit in the bit string 1110 is 1 in the second position, the second bit is 1 in the third position, and the third bit is 0 in the fourth position.

In some embodiments, the third bit may also be used to indicate the used of one of the regular intra-frame chrominance prediction modes when the second bit indicates that the CCLM modes other than the first mode is not used. In some embodiments, the regular intra-frame chrominance prediction modes may include one or more of the Planar mode, DC mode, and 65-angle mode.

In some embodiments, the first mode may include the LT_CCLM mode, the second mode may include the L_CCLM mode, and the third mode may include the T_CCLM mode. In some embodiments, the CCLM mode may be a chrominance prediction mode of the intra-frame prediction. Take Table 4 as an example for illustration. The binarized bit string of the chrominance prediction mode Number 4 10 corresponds to the first mode, that is, the LT_CCLM mode; the binarized bit string of the chrominance prediction mode Number 5 1110 corresponds to the second mode, that is, the L_CCLM mode; and the binarized bit string of the chrominance prediction mode Number 6 1111 corresponds to the third mode, that is, the T_CCLM mode.

In some embodiments, the first mode, the second mode, and the third mode may be modes other than the LT_CCLM mode, the L_CCLM mode, and the T_CCLM mode.

In some embodiments, the image blocks in the to-be-encoded/decoded image may be squares and/or rectangles.

In some embodiments, the bit position in the bit string may be expressed in the form of "bin" in arithmetic encoding/decoding. Of course, in other embodiments, the bit position may also be expressed in other forms, which is not specifically limited here.

In some embodiments, the to-be-encoded/decoded image may be a to-be-encoded/decoded image with CCLM enabled. In some embodiments, the to-be-encoded/decoded image may include at least one image block in which the CCLM is in an on state.

In some embodiments, whether the CCLM is in the on state may be determined by an identifier added during encoding. In some embodiments, when encoding the to-be-encoded image, an identifier may be added to a video parameter set (VPS), a sequence parameter set (SPS), a picture parameter set (PPS), a sequence header, a slice header, or an image header. The identifier may be used to indicate whether the CCLM is permitted to be used in the to-be-encoded image or the to-be-encoded image block, and different values of the identifier may indicate different situations. For example, if the identifier is a second value (e.g., 1), it may indicate that the use of CCLM is permitted, and if the identifier is a first value (e.g., 0), it may indicate that the use of CCLM is not permitted. In some embodiments, when decoding the to-be-decoded image, whether the to-be-decoded image or the to-be-decoded image block is permitted to use of CCLM may be determined based on the decoded identifier. In some embodiments, the decoded identifier may be stored in the VPS, SPS, PPS, sequence header, slice header, or image header. For example, if it is decoded that the identifier exists in the VPS and the identifier is the second value (e.g., 1), it may indicate that the use of CCLM is permitted, and if the identifier is the first value (e.g., 0), it may indicate that the CCLM is not permitted.

In some embodiments, the permission to use CCLM may have the same meaning as when the CCLM is in the on state. That is, if it is determined that the CCLM is in the on state, it may be determined that the CCLM is permitted to be used in the to-be-encoded/decoded image.

In some embodiments, the to-be-encoded/decoded image may include at least one image block with CCLM in the on state and at least one image block with CCLM in an off state. For all image blocks in the to-be-encoded/decoded image, the second bit and the third bit of the image block may be encoded/decoded using mutually independent probability models.

In some embodiments, when the first bit is used to indicate the first mode of the CCLM and the second bit is the first value, the second bit may be used to indicate that the regular intra-frame chrominance prediction mode is used. In some embodiments, the first value may be 0.

In one embodiment, when the first bit is used to indicate the first mode of the CCLM and the second bit satisfies the second value, the second bit may be used to indicate that the second mode or the third mode of the CCLM is used.

In one embodiment, when the second bit is used to indicate that the second mode or the third mode of the CCLM is used, and the third bit satisfied the first value, the third bit may be used to indicate that the second mode of the CCLM is used.

In one embodiment, when the second bit is used to indicate that the second mode or the third mode of the CCLM is used, and the third bit satisfied the second value, the third bit may be used to indicate that the third mode of the CCLM is used. In some embodiments, the second value may be 1.

Take Table 4 as an example. Assume the first value is 0 and the second value is 1. If the video image processing device binarizes the chrominance prediction mode of the image block of the to-be-encoded/decoded image to obtain a bit string of 1110, the bit of the first position is 1, then it can be determined that the chrominance prediction mode of the image block is the CCLM mode or the regular intra-frame chrominance prediction mode; the bit of the second position 1, then it can be determined that the chrominance prediction mode of the image block is not using the LT_CCLM mode in the CCLM mode; the bit of the third position is 1, then it can be determined that the chrominance prediction mode of the image block uses the L_CCLM mode or the T_CCLM mode; and, the bit of the fourth position is 0, then it can be determined that the chrominance prediction mode of the image block uses the L_CCLM mode.

For example, if the video image processing device binarizes the chrominance prediction mode of the image block of the to-be-encoded/decoded image to obtain a bit string of 1111, the bit of the first position is 1, then it can be determined that the chrominance prediction mode of the image block is the CCLM mode or the regular intra-frame chrominance prediction mode; the bit of the second position 1, then it can be determined that the chrominance prediction mode of the image block is not using the LT_CCLM mode in the CCLM mode; the bit of the third position is 1, then it can be determined that the chrominance prediction mode of the image block uses the L_CCLM mode or the T_CCLM mode; and, the bit of the fourth position is 1, then it can be determined that the chrominance prediction mode of the image block uses the T_CCLM mode In one embodiment, when the second bit is used to indicate that the regular intra-frame chrominance prediction mode is used, the last two bits adjacent to the second bit may be used to indicate the number of the regular intra-frame chrominance prediction mode. In some embodiments, if the bit string includes four adjacent bits, it may be determined that the image block uses the regular intra-frame chrominance prediction mode.

For example, if the video image processing device binarizes the chrominance prediction mode of the image block of the to-be-encoded/decoded image to obtain a bit string of 11000, the bit of the first position is 1, then it can be determined that the chrominance prediction mode of the image block is the CCLM mode or the regular intra-frame chrominance prediction mode; the bit of the second position 1, then it can be determined that the chrominance prediction mode of the image block is not using the LT_CCLM mode in the CCLM mode; the bit of the third position is 0, then it can be determined that the chrominance prediction mode of the image block uses the regular intra-frame chrominance prediction mode; and, the bit of the fourth position and the bit of the fifth position are 00, then the number of the regular chrominance prediction mode can be determined as 0.

In another example, if the video image processing device binarizes the chrominance prediction mode of the image block of the to-be-encoded/decoded image to obtain a bit string of 11001, the bit of the first position is 1, then it can be determined that the chrominance prediction mode of the image block is the CCLM mode or the regular intra-frame chrominance prediction mode; the bit of the second position 1, then it can be determined that the chrominance prediction mode of the image block is not using the LT_CCLM mode in the CCLM mode; the bit of the third position is 0, then it can be determined that the chrominance prediction mode of the image block uses the regular intra-frame chrominance prediction mode; and, the bit of the fourth position and the bit of the fifth position are 01, then the number of the regular chrominance prediction mode can be determined as 1.

Similarly, if the video image processing device binarizes the chrominance prediction mode of the image block of the to-be-encoded/decoded image to obtain a bit string of 11010, the bit of the first position is 1, then it can be determined that the chrominance prediction mode of the image block is the CCLM mode or the regular intra-frame chrominance prediction mode; the bit of the second position 1, then it can be determined that the chrominance prediction mode of the image block is not using the LT_CCLM mode in the CCLM mode; the bit of the third position is 0, then it can be determined that the chrominance prediction mode of the image block uses the regular intra-frame chrominance prediction mode; and, the bit of the fourth position and the bit of the fifth position are 10, then the number of the regular chrominance prediction mode can be determined as 2.

Similarly, if the video image processing device binarizes the chrominance prediction mode of the image block of the to-be-encoded/decoded image to obtain a bit string of 11011, the bit of the first position is 1, then it can be determined that the chrominance prediction mode of the image block is the CCLM mode or the regular intra-frame chrominance prediction mode; the bit of the second position 1, then it can be determined that the chrominance prediction mode of the image block is not using the LT_CCLM mode in the CCLM mode; the bit of the third position is 0, then it can be determined that the chrominance prediction mode of the image block uses the regular intra-frame chrominance prediction mode; and, the bit of the fourth position and the bit of the fifth position are 11, then the number of the regular chrominance prediction mode can be determined as 3.

S202, using mutually independent probability models to respectively encode/decode the second bit and the third bit.

In the embodiments of the present disclosure, the video image processing device may use independent probability models to respectively encode/decode the second bit and the third bit. For example, when the value of the second bit is of any value, the third bit may be encoded using the same probability model and will not be affected by the value of the second bit.

Optionally, the second bit and the third bit may use the same context probability model (also referred to as context) for encoding/decoding.

Or, optionally, the second bit and the third bit may be encoded/decoded using different context probability models, which can improve the papalism of the second bit and the third bit's encoding/decoding. Or, the second bit and the third bit may also be encoded/decoded using the bypass probability model. Or, one of the second bit and the third bit may also be encoded/decoded using the bypass probability model, and the other may encoded/decoded using the context probability model, which can also improve the parallelism of encoding/decoding of the second bit and the third bit.

Figure 4:
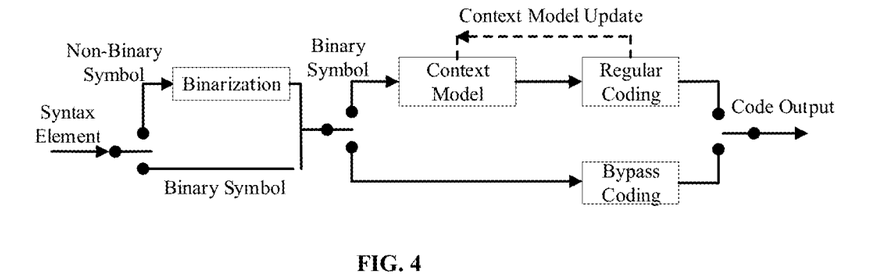
FIG. 4 is a schematic diagram of an arithmetic coding process according to an embodiment of the present disclosure.

In some embodiments, the mutually independent probability models may be referred to a mode that uses independent contexts for encoding, that is, a regular coding mode. More specifically, FIG. 4 can be used as an example to illustrate the bypass coding mode and the regular coding mode. FIG. 4 is a schematic diagram of an arithmetic coding process according to an embodiment of the present disclosure. As shown in FIG. 4, the input non-binary value syntax element is first binarized, and the binary bit string generated by the binarization process then enters the encoding stage. At this time, if the regular coding mode is selected, the bit string may enter the context modeling. After the context model is determined, the bit string and its corresponding context model may be sent to the regular encoding module for encoding. The encoding result may be output, and the context model may be updated based on the encoding result.

In one embodiment, when the video image processing device uses mutually independent probability models to respectively encode/decode the second bit and the third bit, a new context may be added to the third bit of the image block, and the next bit adjacent to the third bit may be encoded/decoded in a bypass mode.

In some embodiments, the bypass mode may be a corresponding bypass coding mode hereinafter. More specifically, FIG. 4 can be used as an example to illustrate the bypass coding mode. As shown in FIG. 4, the input non-binary value syntax element is first binarized, and the binary bit string generated by the binarization process then enters the encoding stage. At this time, if the bypass coding mode is selected, then the 0s and 1s in the bit string generated by the binarization may be considered as equal probability distributions and sent to the bypass coding module for coding, and then the coding result may be output. This mode can reduce the complexity of implementation and speed up the encoding and decoding process.

For example, the video image processing device may add a context number 1 to the third bit of the image block for encoding/decoding. Optionally, the bypass mode may also be used to encode/decode the next bit adjacent to the third bit.

It can be seen that through this implementation, the encoding/decoding modes of the third bit and the adjacent next bit can be determined to be independent of each other, which removes the encoding/decoding dependency between bits in different positions, simplifies the complexity of encoding/decoding for each bit, and improves the encoding/decoding efficiency.

In one embodiment, when the video image processing device uses mutually independent probability models to respectively encode/decode the second bit and the third bit, a new context may be added to the third bit of the image block, and a new context may be added to the next bit adjacent to the third bit to perform encoding/decoding.

For example, the video image processing device may add a Number 2 context to the third bit of the image block for encoding/decoding, and add a Number 0 context to the next bit adjacent to the third bit for encoding/decoding.

It can be seen that through this implementation, the encoding/decoding modes of the third bit and the adjacent next bit can be determined to be independent of each other, which removes the encoding/decoding dependency between bits in different positions, simplifies the complexity of encoding/decoding for each bit, and improves the encoding/decoding efficiency.

In one embodiment, when the video image processing device uses mutually independent probability models to respectively encode/decode the second bit and the third bit, the third bit of the image block may use a bypass mode. Optionally, a new context may be added to the next bit adjacent to the third bit to perform encoding/decoding.

For example, the video image processing device may use the bypass mode to encode/decode the third bit of the image block, and add a context 0 to the next bit adjacent to the third bit to perform encoding/decoding.

It can be seen that through this implementation, the encoding/decoding modes of the third bit and the adjacent next bit can be determined to be independent of each other, which removes the encoding/decoding dependency between bits in different positions, simplifies the complexity of encoding/decoding for each bit, and improves the encoding/decoding efficiency.

In one embodiment, when the video image processing device uses mutually independent probability models to encode/decode the second bit and the third bit, the third bit of the image block may use the same context as the second bit for encoding/decoding.

It can be seen that through this implementation, the encoding/decoding modes of the third bit and the second bit can be determined to be independent of each other, which removes the encoding/decoding dependency between the third bit and the second bit, simplifies the complexity of encoding/decoding for each bit, and improves the encoding/decoding efficiency.

For example, if the video image processing device uses the Number 1 context to encode/decode the second bit, the same Number 1 context of the second bit may also be used to encode/decode the third bit of the image block.

It can be seen that through this implementation, the encoding/decoding modes of the third bit and the second bit can be determined to be independent of each other, which removes the encoding/decoding dependency between the third bit and the second bit, simplifies the complexity of encoding/decoding for each bit, and improves the encoding/decoding efficiency.

In the embodiments of the present disclosure, the video image processing device may binarize the chrominance prediction mode of the image block of the to-be-encoded/decoded image to obtain a bit string. The bit string may include at least three adjacent bits, and the second bit and the third bit in the bit string may be respectively encoded/decoded using mutually independent probability models. Through this implementation, parallel encoding/decoding can be realized, the complexity of encoding/decoding can be reduced, and the efficiency of encoding/decoding can be improved.

When the CCLM mode is turned on, there may be eight chrominance prediction modes. For example, the eight chrominance prediction modes may correspond to the chrominance prediction modes in Table 6. In some embodiments, Numbers 4, 5, and 6 may be chrominance prediction modes that correspond to LT_CCLM, L_CCLM, and T_CCLM modes, respectively, Number 7 may be the DM mode, and Numbers 1, 2, and 3 may be other modes or regular intra-frame chrominance prediction modes.

TABLE 6

| Chrominance Prediction | Luminance Mode | | | | |
|---|---|---|---|---|---|
| Mode Number | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

Table 6 will be used as an example to illustrate the process of looking up the luminance mode by using Table 6. When the CCLM mode is turned on, if the luminance mode Number is 0 and the chrominance prediction mode Number is 5, then based on Table 6, it can be determined that the chrominance prediction mode is using the Number 82 prediction mode. It should be understood that the prediction mode number is not limited to the examples shown in Table 3 or Table 6 above.

In some embodiments, when the first bit indicates to use the CCLM, the second bit may be used to indicate whether to use the first mode of the CCLM. When the second bit indicates that the first mode of the CCLM is not used, the third bit may be used to indicate whether the second mode or the third mode of the CCLM is used. Table 7 below is a specific example. When the CCLM mode is turned on, the chrominance prediction mode number (e.g., the chrominance prediction mode number shown in Table 6) can be binarized as shown in Table 7 below.

TABLE 7

| Chrominance Prediction Mode Number | Binarization |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

As shown in FIG. 7, when the first bit indicates to use the CCLM, the second bit may be used to indicate whether to use the first mode of the CCLM. When the second bit indicates that the first mode of the CCLM is not used, the third bit may be used to indicate whether the second mode or the third mode of the CCLM is used.

When the first bit indicates that the CCLM mode is not used, the second bit may be used to indicate whether the first mode in the regular intra-frame chrominance prediction mode is used. When the second indicates that the first mode in the regular intra-frame chrominance prediction mode is not used, the third bit may be used to indicate whether the second mode or the third mode in the regular intra-frame chrominance prediction mode is used. When the third bit is used to indicate that the second mode or the third mode in the regular intra-frame chrominance prediction mode is used, the fourth bit may be used to indicate whether the second or the third mode in the regular intra-frame chrominance prediction mode is specifically used. When the third bit is used to indicate that the second mode or the third mode of the regular intra-frame chrominance prediction mode is not used, the fourth bit may be used to indicate whether a four mode or a fifth mode of the regular intra-frame chrominance prediction mode is used.

In some embodiments, the probability model used in the encoding/decoding of the chrominance prediction mode number in Table 7 can be as shown in Table 8 below.

TABLE 8

| | Bit Position Idx | | | | | |
|---|---|---|---|---|---|---|
| Syntax Element | 0 | 1 | 2 | 3 | 4 | ≥5 |
| Chrominance prediction mode not using the CCLM mode | na | 1 | bypass | na | | na |
| Chrominance prediction mode using the CCLM mode and the bit value of the bit position Idx equals 0 is 0 | 0 | 1 | bypass | bypass | na | na |
| Chrominance prediction mode using the CCLM mode and the bit value of the bit position Idx equals 0 is 1 | 0 | 1 | bypass | na | na | na | where na is used to indicate an empty coding model, and bypass is used to indicate a bypass coding mode.

As shown in Table 8 above, the bit position Idx includes 0-3, which are used to indicate four bits respectively. In some embodiments, the first bit mentioned above may be the bit at the first position in the bit string (that is, the bit numbered 0), the second bit may be the bit at the second position in the bit string (that is, the bit numbered 1), and the third bit may be the bit at the third position in the bit string (that is, the bit numbered 2). Based on the implementation technical details of the coding chrominance prediction mode numbers shown in Table 8 above, when the CCLM mode is turned on the analyzing process of the first bit and the second bit may be independent of each other. For example, the probability model used by the second bit may not vary with the value of the first bit. Further, the analyzing process of the second bit and the third bit may be independent of each other. For example, the probability model used by the third bit may not vary with the value of the second bit.

Optionally, the first bit and the second bit may use the same context probability model (also referred to as context) for encoding/decoding.

Or, optionally, the first bit and the second bit may use different context probability models for encoding/decoding, which can improve the parallelism of the encoding/decoding of the first bit and the second bit. Or, both the first bit and the chrominance prediction mode may also be encoded/decoded by using the bypass probability model. Or, one of the first bit and the second bit may use the bypass probability model for encoding/decoding, and the other may use the context probability model for encoding/decoding.

In some embodiments, when the CCLM mode is turned on and off, different tables may be used to query the specific prediction mode corresponding to the chrominance prediction mode number. For example, when the CCLM mode is turned off, Table 1 may be used to query the prediction mode corresponding to the chrominance prediction mode number, and when CCLM is turned on, Table 3 may be used to query the prediction mode corresponding to the chrominance prediction mode number.

In some embodiments, when the CCLM mode is turned on and off, the same table may also be used to query the specific prediction mode corresponding to the chrominance prediction mode number. For example, Table 6 may be used to query the prediction mode corresponding to the chrominance prediction mode number when the CCLM is turned off and when it is turned on. As such, when the number of the chrominance prediction mode is binarized to obtain a bit string, when the CCLM mode is turned on and off, the bit string obtained by binarizing the chrominance prediction mode number may be as shown in Table 7. When the CCLM mode is turned off, before performing entropy coding on the binarization result, the first bit (the first bit of the bit string corresponding to numbers 0-4 in Table 7, which is "0") in the binarization result may be deleted and then entropy coding may be performed. That is, when the CCLM mode is turned off, the binarization result corresponding to the chrominance prediction mode number may be still as shown in Table 2.

Figure 3:
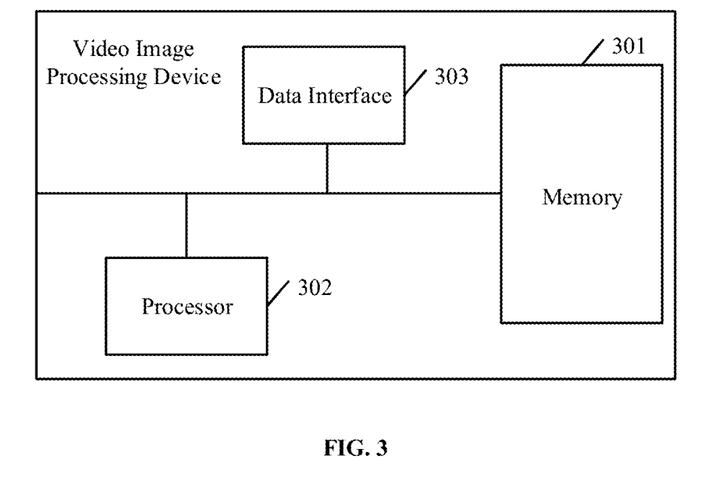
FIG. 3 is a flowchart of a video image processing device according to an embodiment of the present disclosure.

Referring to FIG. 3, which is a flowchart of a video image processing device according to an embodiment of the present disclosure. More specifically, the video image processing device includes a memory 301, a processor 302, and a data interface 303.

The memory 301 may include a volatile memory, a non-volatile memory, or any combination of thereof. The processor 302 may include a central processing unit (CPU). The processor 302 may include a hardware chip. The hardware chip may include an application-specific integrated circuit (ASIC), a programmable logic device (PLD), or any combination thereof. For example, the hardware ship may include a complex programmable logic device (CPLD), a field-programmable gate array (FPGA), or any combination thereof.

The memory 301 can be configured to store program instructions. The processor 302 can call the program instructions stored in the memory 301 to binarize the chrominance prediction mode of the image block of the to-be-encoded/decoded image to obtain a bit string, the bit string including at least three adjacent bits. In some embodiments, the to-be-encoded/decoded image may use a cross-component linear model (CCLM) and/or a regular intra-frame chrominance prediction mode. The CCLM may include at least a first mode, a second mode, and a third mode, and the regular intra-frame chrominance prediction mode may be another chrominance prediction mode other than the CCLM.

In some embodiments, the first bit of the three adjacent bits may be used to indicate whether to use the first mode of the CCLM. When the first bit indicates that the first mode of the CCLM is not used, the second bit may be used to indicate whether other modes of the CCLM other than the first mode is used. When the second bit indicates that the CCLM mode other than the first mode is used, the third bit may be used to indicate that the image block uses the second mode or the third mode of the CCLM.

Alternatively, the first bit of the three adjacent bits may be used to indicate whether to use the CCLM. When the first bit indicates to use the CCLM, the second bit may be used to indicate whether to use the first mode of the CCLM. When the second bit indicates that the first mode of the CCLM is not used, the third bit may be used to indicate whether the second mode or the third mode of the CCLM is used.

In some embodiments, the processor 302 may be further configured to use mutually independent probability models to respectively encode/decode the second bit and the third bit.

Further, the mutually independent probability models may be used to respectively encode/decode the three adjacent bits.

Further, the third bit may also be used to indicate the used of one of the regular intra-frame chrominance prediction modes when the second bit indicates that the CCLM modes other than the first mode is not used.

Further, the to-be-encoded/decoded image may include at least one image block in which the CCLM is in an on state.

Further, the to-be-encoded/decoded image may include at least one image block with the CCLM in the on state and at least one image block with the CCLM in an off state. For all image blocks in the to-be-encoded/decoded image, the second bit and the third bit of the image block may be encoded/decoded using mutually independent probability models.

Further, when the value of the first bit satisfies the first value, the first bit may be used to indicate that the first mode of the CCLM is used.

Further, when the first bit is used to indicate the first mode of the CCLM and the second bit satisfies the first value, the second bit may be used to indicate that the regular intra-frame chrominance prediction mode is used.

Further, the first value may be 0.

Further, when the first bit is used to indicate the first mode of the CCLM and the second bit satisfies the second value, the second bit may be used to indicate that the second mode or the third mode of the CCLM is used.

Further, when the second bit is used to indicate that the second mode or the third mode of the CCLM is used, and the third bit satisfied the first value, the third bit may be used to indicate that the second mode of the CCLM is used.

Further, when the second bit is used to indicate that the second mode or the third mode of the CCLM is used, and the third bit satisfied the second value, the third bit may be used to indicate that the third mode of the CCLM is used.

Further, the second value may be 1.

Further, when the second bit is used to indicate that the regular intra-frame chrominance prediction mode is used, the last two bits adjacent to the second bit may be used to indicate the number of the regular intra-frame chrominance prediction mode.

Further, when the processor 302 uses mutually independent probability models to respectively encode/decode the second bit and the third bit, the third bit of the image block may be encoded/decoded in a bypass mode.

Further, when the processor 302 uses mutually independent probability models to respectively encode/decode the second bit and the third bit, a new context may be added to the third bit of the image block, and the bypass mode may be used to encode/decode the next bit adjacent to the third bit.

Further, when the processor 302 uses mutually independent probability models to respectively encode/decode the second bit and the third bit, a new context may be added to the third bit of the image block, and a new context may be added to the next bit adjacent to the third bit to perform encoding/decoding.

Further, when the processor 302 uses mutually independent probability models to respectively encode/decode the second bit and the third bit, the third bit of the image block may use the bypass mode, and a new context may be added to the next bit adjacent to the third bit to perform encoding/decoding.

Further, when the processor 302 uses mutually independent probability models to respectively encode/decode the second bit and the third bit, the third bit of the image block may be encoded/decoded in the same context as the second bit.

Further, the first mode may include the LT_CCLM mode, the second mode may include the L_CCLM mode, and the third mode may include the T_CCLM mode.

Further, the CCLM mode may be a chrominance prediction mode of the intra-frame prediction.

Further, the image blocks in the to-be-encoded/decoded image may be squares and/or rectangles.

Further, the first bit may be a bit at the second position in the bit string, the second bit may be a bit at the third position in the bit string, and the third bit may be a bit at the fourth position in the bit string.

Further, the regular intra-frame chrominance prediction modes may include one or more of the Planar mode, DC mode, and 65-angle mode.

In some embodiments, the first bit of the three adjacent bits may be used to indicate whether to use the CCLM. When the first bit indicates to use the CCLM, the second bit may be used to indicate whether to use the first mode of the CCLM. When the second bit indicates that the first mode of the CCLM is not used, the third bit may be used to indicate whether the second mode or the third mode of the CCLM is used.

Optionally, mutually independent probability models may be used to respectively encode/decode the first bit and the second bit.

Optionally, when the first bit indicates that the CCLM mode is not used, the second bit may be used to indicate whether one of the regular intra-frame chrominance prediction modes is used.

Optionally, when the first bit indicates that the CCLM mode is not used, the second bit may be used to indicate whether the first mode in the regular intra-frame chrominance prediction modes is used. When the second bit indicates that the first mode in the regular intra-frame chrominance prediction mode is not used, the third bit may be used to indicate whether the second mode or the third mode in the regular intra-frame chrominance prediction mode is used.

Optionally, the bit string may further include a fourth bit. When the third bit is used to indicate that the second mode or the third mode in the regular intra-frame chrominance prediction mode is used, the fourth bit may be used to indicate whether the second or the third mode in the regular intra-frame chrominance prediction mode is specifically used. When the third bit is used to indicate that the second mode or the third mode of the regular intra-frame chrominance prediction mode is not used, the fourth bit may be used to indicate whether a four mode or a fifth mode of the regular intra-frame chrominance prediction mode is used.

Optionally, using the mutually independent probability models to respectively encode/decode the first bit and the second bit may include using different context probability models to respectively encode/decode the first bit and the second bit.

Optionally, the method may further include encoding/decoding the third bit of the image block in a bypass mode.

Optionally, the mutually independent probability models may be used to encode/decode the three adjacent bits respectively.

In the embodiments of the present disclosure, the video image processing device may binarize the chrominance prediction mode of the image block of the to-be-encoded/decoded image to obtain a bit string. The bit string may include at least three adjacent bits, and the second bit and the third bit in the bit string may be respectively encoded/decoded using mutually independent probability models. Through this implementation, parallel encoding/decoding can be realized, the complexity of encoding/decoding can be reduced, and the efficiency of encoding/decoding can be improved.

The embodiments of the present disclosure also provide a computer-readable storage medium storing a computer program. When the computer program is executed by the processor, the video image processing method in FIG. 2 may be implemented, and the video image processing device in FIG. 4 may be implemented, and detailed description thereof is omitted herein.

The computer-readable storage medium may include an internal storage unit of the device consistent with the disclosure, such as a hard disk or a memory of the device. The computer-readable storage medium may further include an external storage device of the device, such as a plug-in hard disk, a smart memory card (SMC), a secure digital (SD) card, a flash card, and any storage medium arranged at the device. The computer-readable storage medium may further include both the internal storage unit of the device and the external storage device. The computer-readable storage medium can be configured to store the computer program and other programs and data required by the terminal. The computer-readable storage medium can be further configured to temporarily store data that has been or will be output.

Some or all of the processes of the method described above can be executed by hardware running program instructions. The program may be stored in a computer-readable storage medium. When the program is executed, one or any combination of the processes of the method are executed. The computer-readable storage medium can include a magnetic disk, an optical disk, a read-only memory (ROM) or a random-access memory (RAM), or the like.

It is intended that the disclosed embodiments be considered as exemplary only and not to limit the scope of the disclosure. Changes, modifications, alterations, and variations of the above-described embodiments may be made by those skilled in the art within the scope of the disclosure.

What is claimed is:

1. A video image processing method comprising:
    binarizing a chrominance prediction mode of an image block of a to be encoded or decoded image to obtain a bit string, the bit string including at least two adjacent bits, the to be encoded or decoded image being permitted to use at least one of a cross-component linear model (CCLM) or a regular intra-frame chrominance prediction mode, the CCLM including at least a first mode, a second mode, and a third mode, the regular intra-frame chrominance prediction mode being other intra-frame chrominance prediction modes expect the CCLM, wherein:
    a first bit of the adjacent bits is used to indicate whether the CCLM is used, a second bit is used to indicate whether to use the first mode of the CCLM when the first bit indicates to use the CCLM, a third bit is used to indicate whether the second mode or the third mode of the CCLM is used when the second bit indicates that the first mode of the CCLM is not used; and
    using mutually independent probability models to respectively encode or decode the first bit and the second bit.

2. The method of claim 1, wherein:
    the second bit is used to indicate whether one of the regular intra-frame chrominance prediction modes is used when the first bit indicates that the CCLM is not used.

3. The method of claim 2, wherein:
the second bit is used to indicate whether a first mode in the regular intra-frame chrominance prediction mode is used when the first bit indicates that the CCLM is not used; and
the third bit is used to indicate whether a second or a third mode in the regular intra-frame chrominance prediction mode is used when the second bit indicates that the first mode in the regular intra-frame chrominance prediction mode is not used.

4. The method of claim 3, wherein:
the bit string also includes a fourth bit,
the fourth bit being used to indicate whether the second or the third mode in the regular intra-frame chrominance prediction mode is specifically used when the third bit is used to indicate that the second mode or the third mode in the regular intra-frame chrominance prediction mode is used; the fourth bit being used to indicate whether a four mode or a fifth mode in the regular intra-frame chrominance prediction mode is used when the third bit is used to indicate that the second mode or the third mode in the regular intra-frame chrominance prediction mode is not used.

5. The method of claim 1, wherein:
the to be encoded or decoded image includes at least one image block with the CCLM in an on state.

6. The method of claim 1, wherein:
the to be encoded or decoded image includes at least one image block with the CCLM in an on state and at least one image block with the CCLM in an off state; and
the first bit and the second bit of the image block use the mutually independent probability models for encoding or decoding for all image block in the to be encoded or decoded image.

7. The method of claim 1, wherein using the mutually independent probability models to respectively encode or decode the first bit and the second bit includes:
using a same context probability model to encode or decode the first bit and the second bit; or,
respectively using different context probability models to encode or decode the first bit and the second bit; or,
using a bypass probability model to encode or decode both the first bit and the second bit; or,
using the bypass probability model to encode or decode one of the first bit and the second bit, and using the context probability model to encode or decode the other.

8. The method of claim 1 further comprising:
encoding or decoding the third bit of the image block by using a bypass mode.

9. The method of claim 1 further comprising:
using the mutually independent probability models to respectively encode or decode the second bit and the third bit; or,
using the mutually independent probability models to respectively encode or decode the at least two adjacent bits.

10. The method of claim 1, wherein:
the first mode includes a LT_CCLM mode;
the second mode includes a L_CCLM mode; and
the third mode includes a T_CCLM mode.

11. The method of claim 1, wherein:
the CCLM mode is a chrominance prediction mode for intra-frame prediction.

12. The method of claim 1, wherein:
the image blocks in the to be encoded or decoded image are at least one of squares or rectangles.

13. The method of claim 1, wherein:
the first bit is a first position bit in the bit string;
the second bit is second third position bit in the bit string; and
the third bit is a third position bit in the bit string.

14. The method of claim 1, wherein:
the regular intra-frame chrominance prediction mode includes any one or more of Planar mode, DC mode, and 65 angle mode.

15. The method of claim 1 further comprising:
transmitting an encoded bitstream to a video image processing device for decoding.

16. A video image processing device comprising:
a processor; and
a memory storing program instructions that, when being executed by the processor, cause the processor to:
binarize a chrominance prediction mode of an image block of a to be encoded or decoded image to obtain a bit string, the bit string including at least two adjacent bits, the to be encoded or decoded image being permitted to use at least one of a cross-component linear model (CCLM) or a regular intra-frame chrominance prediction mode, the CCLM including at least a first mode, a second mode, and a third mode, the regular intra-frame chrominance prediction mode being other intra-frame chrominance prediction mode expect the CCLM, wherein:
a first bit of the adjacent bits is used to indicate whether the CCLM is used, the second bit is used to indicate whether to use the first mode of the CCLM when the first bit indicates to use the CCLM, the third bit is used to indicate whether the second mode or the third mode of the CCLM is used when the second bit indicates that the first mode of the CCLM is not used; and
use mutually independent probability models to respectively encode or decode the second bit and the third bit.

17. A non-transitory computer-readable storage medium storing a bitstream obtained by a processor executing a computer program to:
binarize a chrominance prediction mode of an image block of a to be encoded or decoded image to obtain a bit string, the bit string including at least two adjacent bits, the to be encoded or decoded image being permitted to use at least one of a cross-component linear model (CCLM) or a regular intra-frame chrominance prediction mode, the CCLM including at least a first mode, a second mode, and a third mode, the regular intra-frame chrominance prediction mode being other intra-frame chrominance prediction modes expect the CCLM, wherein:
a first bit of the adjacent bits is used to indicate whether the CCLM is used, a second bit is used to indicate whether to use the first mode of the CCLM when the first bit indicates to use the CCLM, a third bit is used to indicate whether the second mode or the third mode of the CCLM is used when the second bit indicates that the first mode of the CCLM is not used; and
use mutually independent probability models to respectively encode or decode the first bit and the second bit.

* * * * *